(12) United States Patent
Damnjanovic et al.

(10) Patent No.: US 9,094,988 B2
(45) Date of Patent: Jul. 28, 2015

(54) METHOD AND APPARATUS FOR PERFORMING RANDOM ACCESS ON A SECONDARY CARRIER

(71) Applicant: QUALCOMM Incorporated, San Diego, CA (US)

(72) Inventors: Jelena M. Damnjanovic, Del Mar, CA (US); Peter Gaal, San Diego, CA (US); Wanshi Chen, San Diego, CA (US); Aleksandar Damnjanovic, Del Mar, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 13/740,886

(22) Filed: Jan. 14, 2013

(65) Prior Publication Data

US 2013/0182688 A1    Jul. 18, 2013

Related U.S. Application Data

(60) Provisional application No. 61/587,556, filed on Jan. 17, 2012.

(51) Int. Cl.
*H04W 74/08* (2009.01)
*H04W 56/00* (2009.01)
*H04L 5/00* (2006.01)
*H04L 27/26* (2006.01)
*H04W 74/00* (2009.01)

(52) U.S. Cl.
CPC .......... *H04W 74/0833* (2013.01); *H04L 5/001* (2013.01); *H04L 27/2662* (2013.01); *H04L 27/2689* (2013.01); *H04W 56/00* (2013.01); *H04W 56/0045* (2013.01); *H04W 74/00* (2013.01)

(58) Field of Classification Search
None
See application file for complete search history.

(56) References Cited

U.S. PATENT DOCUMENTS

| 8,462,610 B1 * | 6/2013 | Dinan ........................... 370/206 |
| 8,520,497 B1 * | 8/2013 | Dinan ........................... 370/206 |
| 2011/0021154 A1 | 1/2011 | Marinier et al. |
| 2011/0103332 A1 | 5/2011 | Kuo |
| 2011/0170535 A1 * | 7/2011 | Wang et al. ................... 370/350 |

(Continued)

FOREIGN PATENT DOCUMENTS

| EP | 2343935 A2 | 7/2011 |
| WO | 2011116242 A1 | 9/2011 |

OTHER PUBLICATIONS

International Search Report and Written Opinion—PCT/US2013/021561—ISA/EPO—May 27, 2013.

(Continued)

*Primary Examiner* — Kerri Rose
(74) *Attorney, Agent, or Firm* — Arent Fox LLP

(57) ABSTRACT

Methods and apparatus are described herein for synchronizing timing when using a secondary component carrier (SCC) in a carrier aggregated wireless network. A user equipment (UE) may determine that it is out of synchronization with respect to an SCC used to communicate with a network element. The UE may inform the network element of the out of synchronization status, and may perform a random access procedure to synchronize the timing.

52 Claims, 14 Drawing Sheets

(56) References Cited

U.S. PATENT DOCUMENTS

| | | |
|---|---|---|
| 2011/0206000 A1* | 8/2011 | Kwon et al. .................. 370/330 |
| 2012/0057547 A1 | 3/2012 | Lohr et al. |
| 2012/0063302 A1 | 3/2012 | Damnjanovic et al. |
| 2012/0087270 A1* | 4/2012 | Wan et al. .................... 370/252 |
| 2012/0218987 A1* | 8/2012 | Zhao et al. ................... 370/350 |
| 2012/0250520 A1 | 10/2012 | Chen et al. |
| 2012/0287865 A1 | 11/2012 | Wum et al. |
| 2014/0023055 A1* | 1/2014 | Jeong et al. .................. 370/336 |

OTHER PUBLICATIONS

Panasonic: "RACH on SCell for supporting Multiple Timing Advance", 3GPP Draft; R2-112806_RACH_PR0CEDURE, 3rd Generation Partnership Project (3GPP), Mobile Competence Centre ; 650, Route Des Lucioles ; F-06921 Sophia-Antipolis Cedex ; France, vol. RAN WG2, no. Barcelona, Spain; May 9, 2011, May 2, 2011, XP050495107.

* cited by examiner

METHOD AND APPARATUS FOR PERFORMING RANDOM ACCESS ON A SECONDARY CARRIER

CROSS-REFERENCE TO RELATED APPLICATION(S)

This application claims the benefit of U.S. Provisional Application Ser. No. 61/587,556, entitled "Method and Apparatus for Performing Random Access on a Secondary Carrier" and filed on Jan. 17, 2012, which is expressly incorporated by reference herein in its entirety.

BACKGROUND

1. Field

Aspects of the present disclosure relate generally to wireless communication systems, and more particularly, to performing random access procedures.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. In addition, such networks can conform to one or more network specifications, such as third generation partnership project (3GPP), 3GPP long term evolution (LTE), and/or the like.

A wireless communication network may include a number of evolved Node Bs (referred herein to as eNodeBs or eNBs) that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

Some wireless communication networks support carrier aggregation (CA) for a UE. In such configurations, the UE can simultaneously communicate with one or more eNodeBs over multiple downlink and/or uplink carriers to improve data throughput. One of the multiple carriers can be designated as a primary component carrier (PCC) over which certain control data or other high priority data can be communicated regarding the PCC and one or more of the other carriers (e.g., secondary component carriers (SCC)). Previous configurations allowed uplink communications only on the PCC, and thus timing adjustment (TA) could be accomplished over the single PCC with respect to the downlink over the PCC or other carriers. Allowing uplink communications over multiple carriers, however, can lead to TA considerations for each of the carriers.

SUMMARY

Techniques for performing random access procedures over secondary component carriers (SCC) in carrier aggregation (CA) are provided. In one example, an eNodeB can determine that a device did not receive a timing adjustment (TA) command from the eNodeB during a TA period, and can accordingly cause the device to perform a random access procedure to resynchronizing timing with the eNodeB and the SCC. This can be based on receiving related signaling from the device, determining that the device is not communicating over the SCC, etc. In another example, the eNodeB can allow devices to perform contention based random access procedures over the SCC.

In an aspect, a method for synchronizing timing related to a SCC in carrier aggregated wireless networks is provided. The method includes determining an out-of-synchronization status with respect to an SCC utilized to communicate with an eNodeB, signaling an indication of the out-of-synchronization status to the eNodeB, and performing a random access procedure with the eNodeB to synchronize timing for communicating over the SCC.

Various aspects and features of the disclosure are described in further detail below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
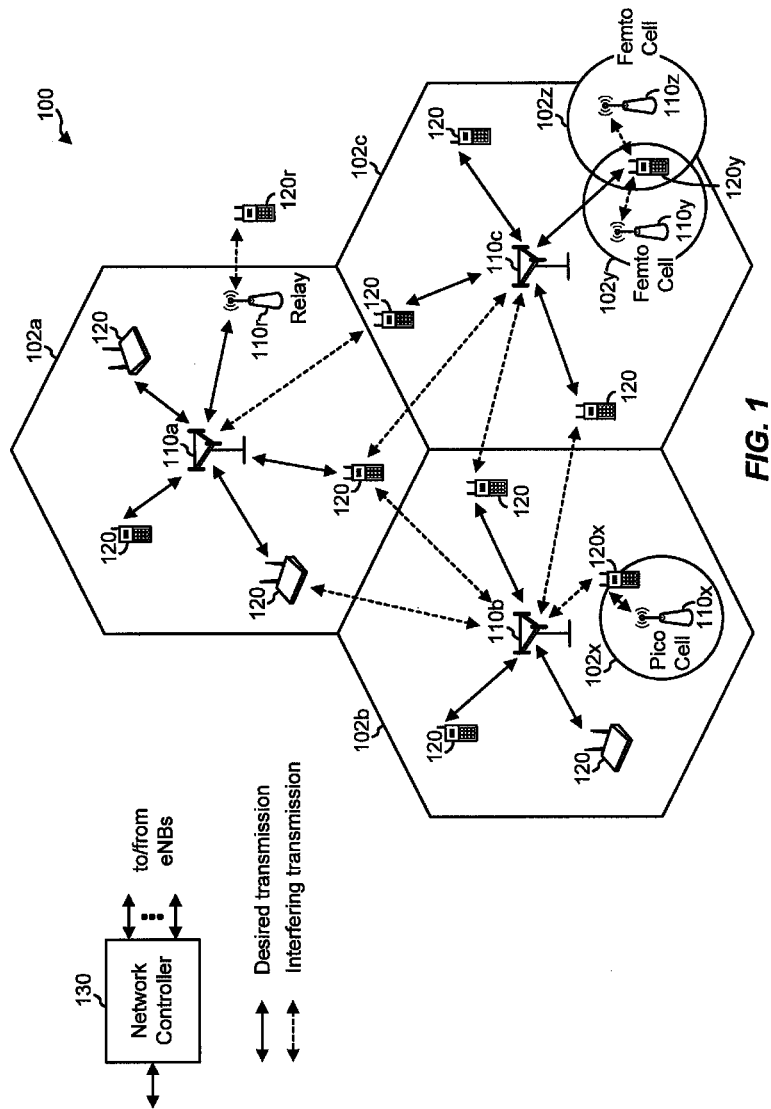
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a device, a terminal, a mobile station, a subscriber unit, a station, etc. A UE may be a cellular phone, a personal digital assistant (PDA), a wireless modem (or other tethered device), a wireless communication device, a handheld device, a laptop computer, a tablet or netbook computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a LIE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM or a similar multiplexing scheme and in the time domain with SC-FDM or a similar multiplexing scheme. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
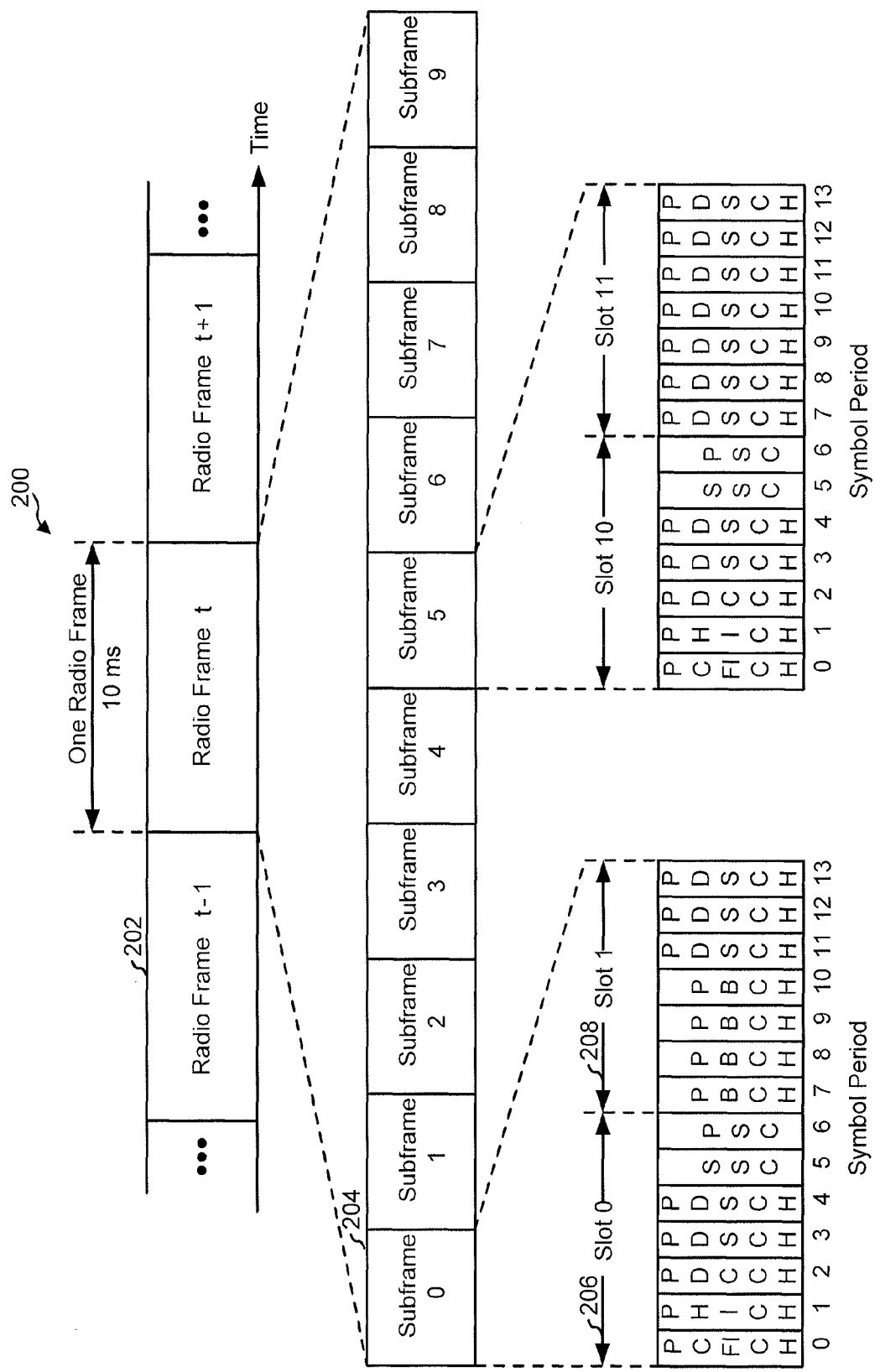
FIG. 2 is a block diagram conceptually illustrating an example of a downlink frame structure in a telecommunications system.

FIG. 2 shows a downlink frame structure 200 used in LTE. The transmission timeline for the downlink may be partitioned into units of radio frames, such as radio frame 202. Each radio frame may have a predetermined duration (e.g., 10 milliseconds (ms)) and may be partitioned into 10 subframes with indices of 0 through 9, such as subframe 0 204. Each subframe may include two slots, such as slot 0 206 and slot 1 208. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical hybrid automatic repeat/request (HARQ) Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels can correspond to an LTE configuration.

The eNB may send the PSS, SSS and PBCH in a center of the system bandwidth used by the eNB (e.g., a center 1.08 megahertz (MHz)). The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REG). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
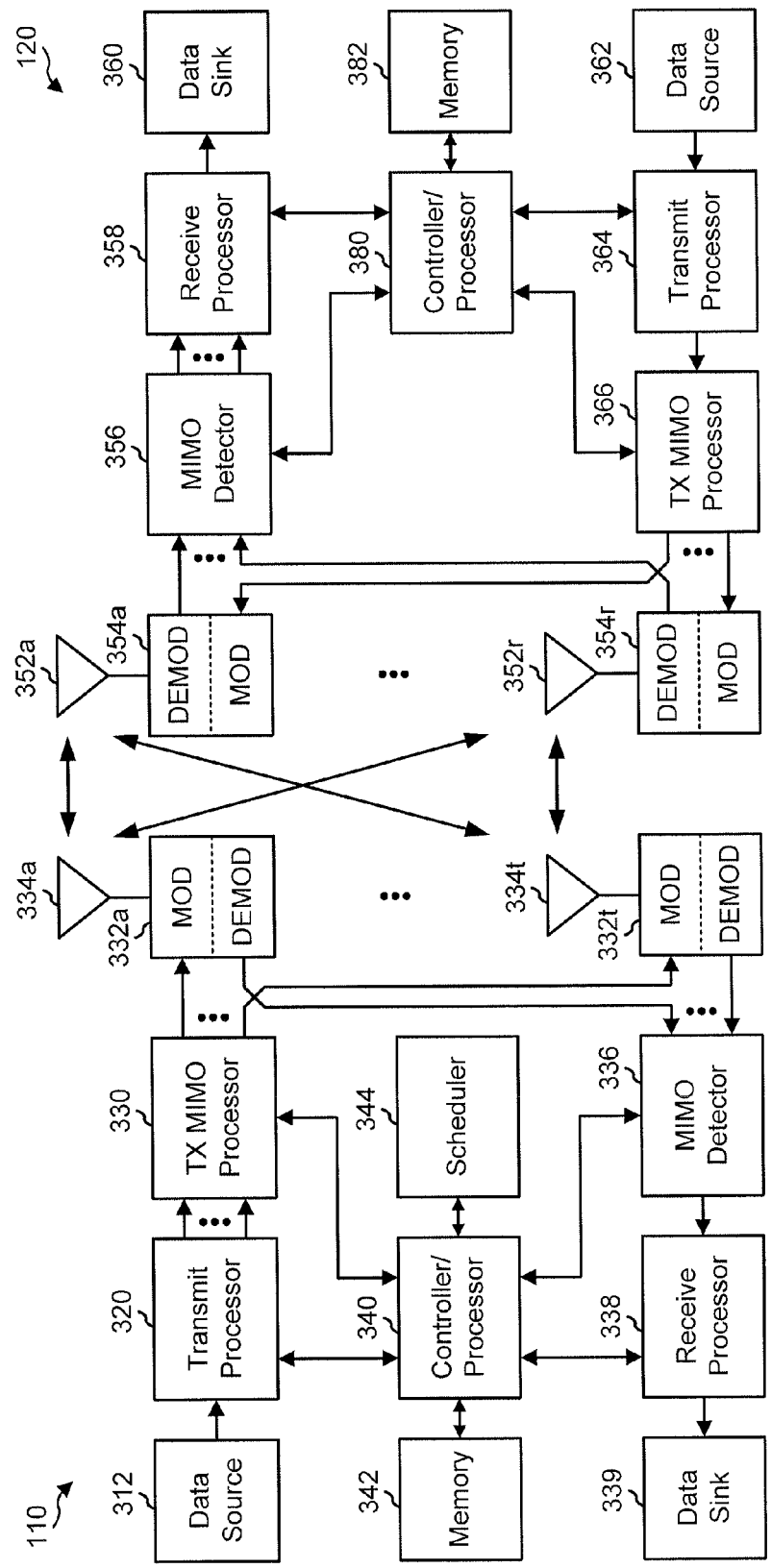
FIG. 3 is a block diagram conceptually illustrating is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNB 110c in FIG. 1, and the UE 120 may be the UE 120y. The eNodeB 110 may also be an eNodeB of some other type. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processors 340, 380, and/or other processors and modules at the eNB 110 and/or UE 120 may also perform or direct the execution of the functional blocks illustrated in FIGS. 6 and 9-12, and/or other processes for the techniques described herein. In addition, for example, the processors 340, 380, etc. can comprise or at least be operatively coupled to modules illustrated in FIGS. 8 and 13-16 for performing aspects described herein. The memories 342 and 382 may store data and program codes for the eNodeB 110 and the UE 120, respectively, which can include instructions for executing the methods in FIGS. 6 and 9-12, the modules in FIGS. 8 and 13-16, and/or the like. A scheduler 344 may schedule UEs for data transmission on the downlink and/or uplink.

Carrier Aggregation

LTE-Advanced UEs can use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments can conserve spectrum and are a good fit for the typically asymmetric bandwidth utilization by broadband subscribers, though other assignments can be possible.

Carrier Aggregation Types

Figure 4A:
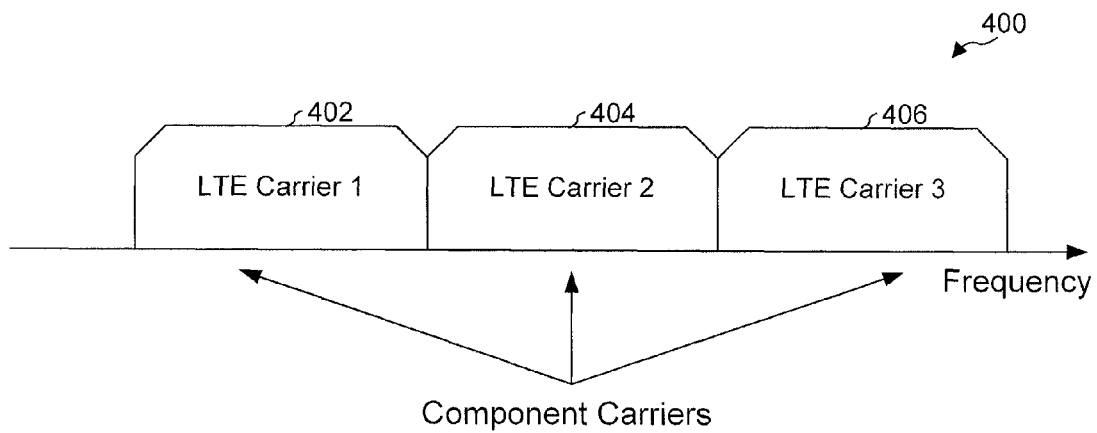
FIG. 4A discloses a continuous carrier aggregation type.
Figure 4B:
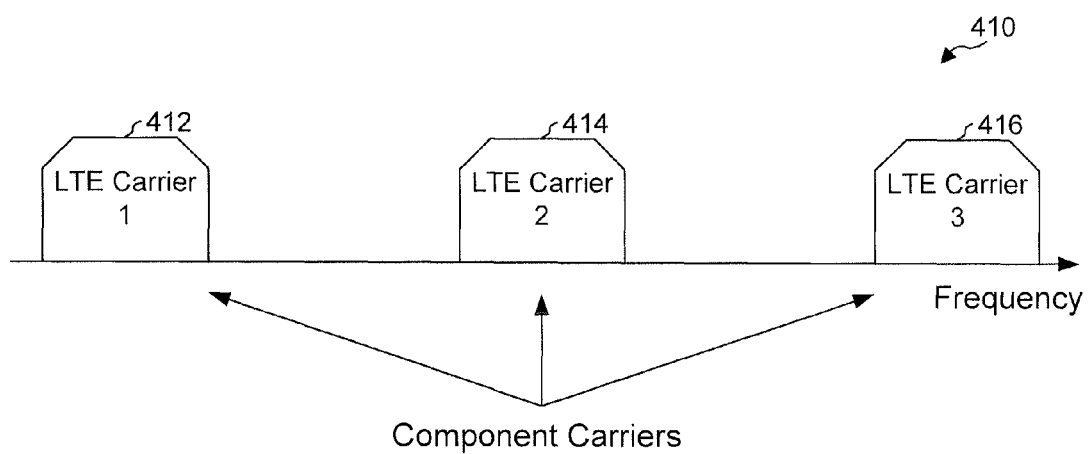
FIG. 4B discloses a non-continuous carrier aggregation type.

For the LTE-Advanced mobile systems, two types of carrier aggregation (CA) methods have been proposed, continuous CA and non-continuous CA, examples of which are illustrated in FIGS. 4A and 4B. Non-continuous CA occurs when multiple available component carriers 410 are separated along the frequency band (FIG. 4B). On the other hand, continuous CA occurs when multiple available component carriers 400 are adjacent to each other (FIG. 4A). As shown, for example, in continuous CA, carrier 1 402, carrier 2 404, and carrier 3 406 are adjacent in frequency. In non-continuous CA, carrier 1 412, carrier 2 414, and carrier 3 416 are not adjacent in frequency. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
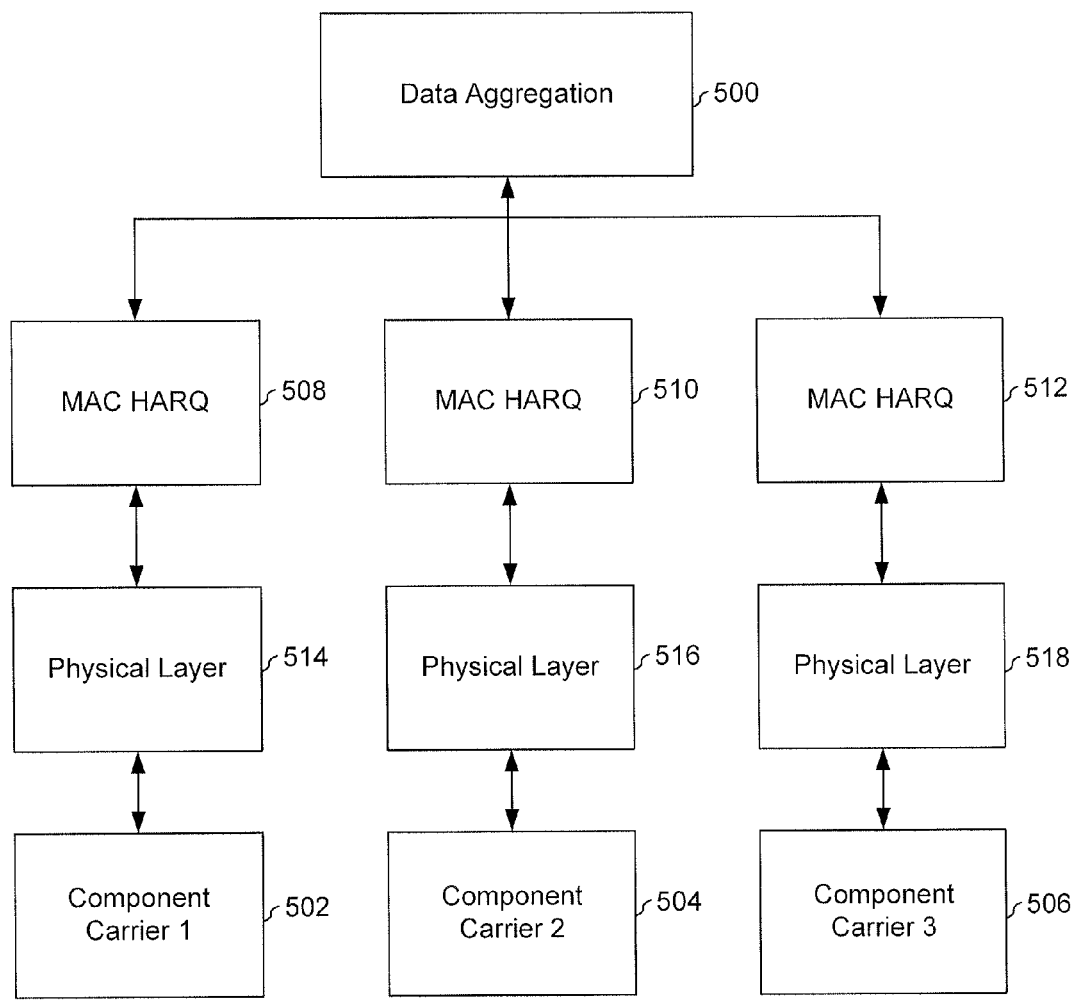
FIG. 5 discloses MAC layer data aggregation.

FIG. 5 illustrates performing data aggregation 500 to aggregate transmission blocks (TBs) from different component carriers 502, 504, and 506 at the medium access control (MAC) layer (FIG. 5) for an International Mobile Telecommunications (IMT)-Advanced or similar system. With MAC layer data aggregation, each component carrier has its own independent hybrid automatic repeat request (HARQ) entity 508, 510, and 512 in the MAC layer and its own transmission configuration parameters (e.g., transmitting power, modulation and coding schemes, and multiple antenna configuration) in the physical layer. Similarly, in the physical layer, one HARQ entity 514, 516, and 518 can be provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. This component carrier can be referred to as the primary component carrier (PCC), where remaining component carriers can be referred to as secondary component carriers (SCC). In another example, the PCC can be referred to as the anchor carrier. The control information for the multiple component carriers can be integrated as the signaling content in this dedicated control channel over the dedicate component carrier. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (e.g., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Figure 6:
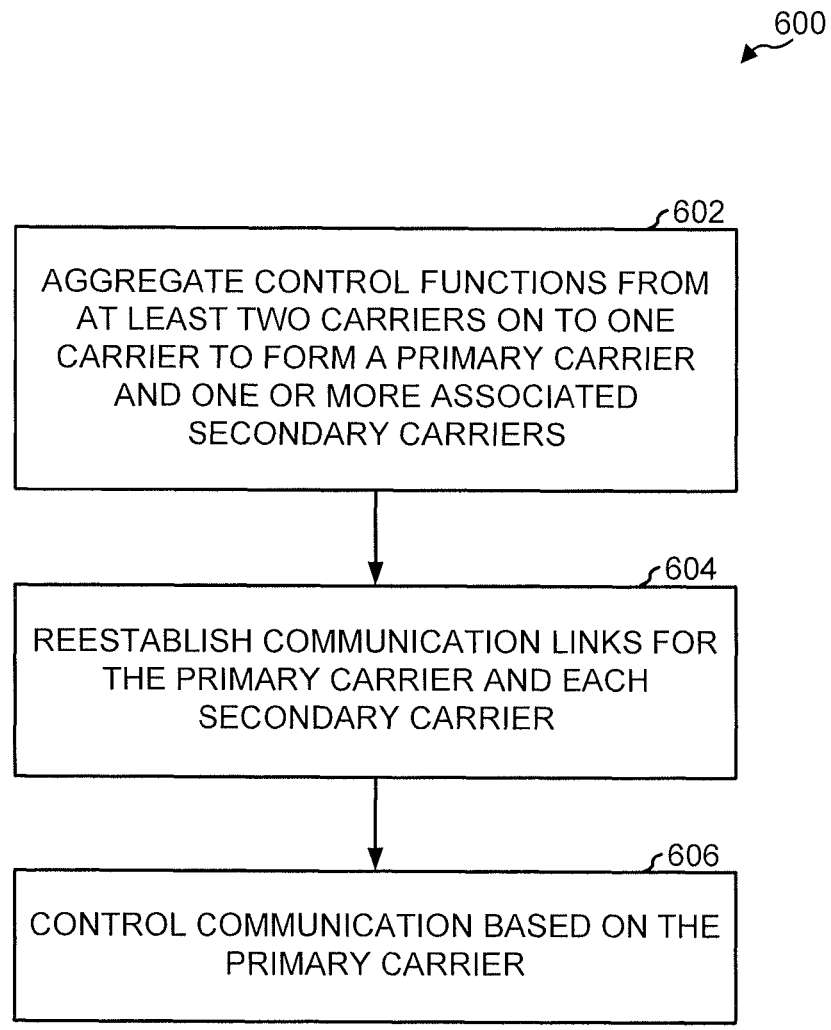
FIG. 6 is a block diagram illustrating a methodology for controlling radio links in multiple carrier configurations.

FIG. 6 illustrates a methodology 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next at block, 604, communication links are established for the primary carrier and each secondary carrier. Then, communication is controlled based on the primary carrier in block 606.

Performing Random Access in Carrier Aggregation

Figure 7:
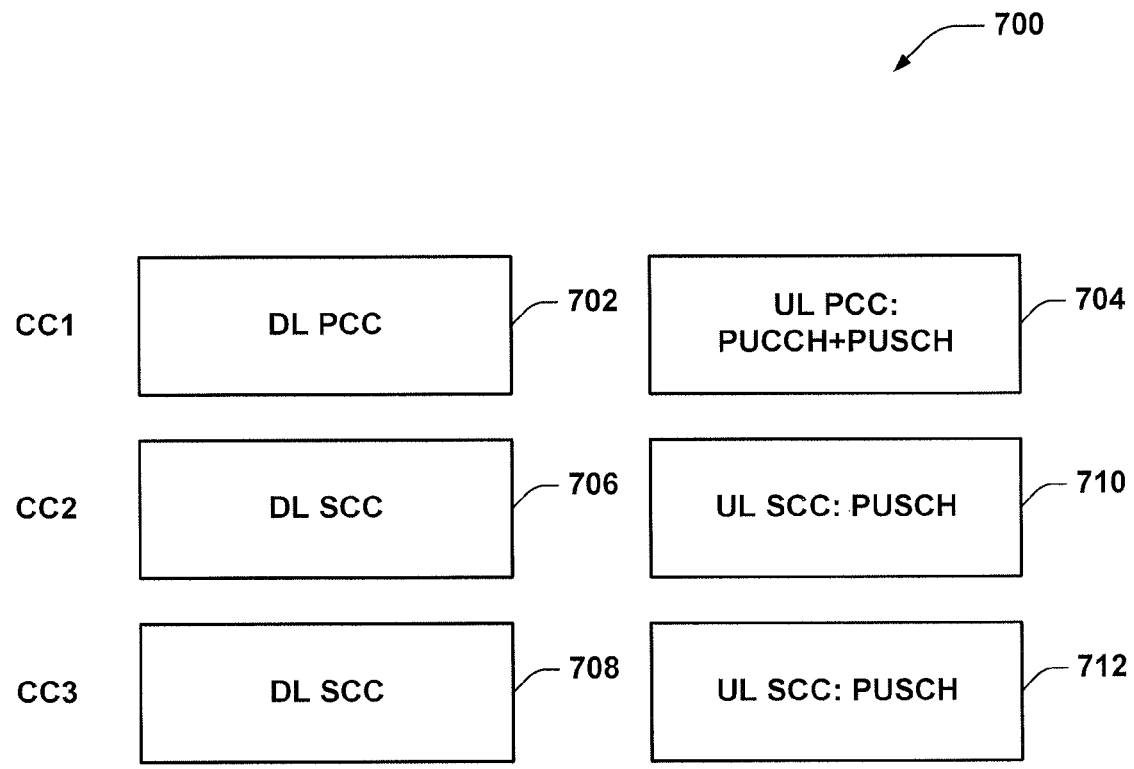
FIG. 7 is a block diagram of example carrier assignments.

FIG. 7 illustrates an example carrier configuration 700 for a UE. For example, the UE can communicate over multiple component carriers (CC), such as CC1, CC2, CC3, etc., where one CC (e.g., CC1) is designated as the primary CC comprising a downlink PCC 702 and an uplink PCC 704. The DL PCC 702 includes downlink communications from an eNodeB, and the UL PCC 704 includes uplink communications from the UE to the eNodeB, and can be used for control communications (e.g., over a PUCCH), as well as data communications (e.g., over a PUSCH). In one example, the eNodeB or related cell with which the PCC is established can be referred to as the PCell. Other CCs, such as CC2 and CC3, are called secondary CCs (SCC) and include at least a DL SCC 706 and 708 over which the UE can receive additional downlink communications from the eNodeB or one or more other eNodeBs. In some aspects, the PCC for the UE may be configured for communication with a first eNodeB while an SCC is configured to communicate with a second eNodeB. Similarly, the eNodeB or related cell with which the SCC(s) are established can be referred to as SCell(s).

In previous configurations, such as LTE Release 10, the PCC was semi-statically configured by higher layers on a per UE basis. In addition, control information was transmitted on the PCC, e.g., the acknowledgement (ACK)/non-ACK (NAK) in HARQ, channel quality indicator (CQI) and scheduling request (SR) reports, etc., when transmitted. The SCCs did not carry a PUCCH for a given UE in LTE Release 10. Thus, in examples where up to a 5:1 DL to UL CC mapping was possible, one UL PCC 704 supported ACK/NAK transmission on PUCCH for up to 5 DL CCs. In LTE Release 10, random access (RA) is supported on the primary cell (PCell) only where the UL PCC 704 is the only UL CC carrying control data for the DL PCC 702 and DL SCCs 706 and/or 708.

A random access occurs in LTE when a UE requests a connection setup. This may occur, for example, to establish uplink synchronization, to establish communication resources, and/or the like. The main objective is acquisition of uplink timing. There are two types of random access in LTE: contention based random access or contention-free (also referred to herein as non-contention based) random access. There are two steps taken with contention-free random access. First, transmit a random-access preamble. This permits estimation of the transmission timing of the UE by the eNodeB. Uplink synchronization allows the UE to transmit uplink data. Second, a timing advance (TA) command is sent by the network to adjust the transmit timing of the UE which establishes uplink synchronization. With contention based random access, two additional steps are taken. Third, the UE transmits its identity to the network. And fourth, the network transmits a contention resolution message to the UE on the DL-SCH. The one terminal for which there is a match between the identity received in the contention resolution message and the identity transmitted to the network in the third step will declare a successful random-access procedure. It is a contention based RACH procedure when the UE itself ("randomly") selects the preamble. In this case, the preamble is called a contention based preamble. It is a non-contention based RACH procedure if the UE receives allocation of the preamble directly from the network through the radio resource control (RRC) or PDCCH (i.e. an explicitly signaled preamble), in this case, the preamble is called a dedicated preamble. A single timing adjustment (TA) is supported across all cells in LTE Release 10. In LTE Release 11, multiple timing adjustments are possible for the multiple carriers. One for the PCell, and others for the SCells. Hence, random access is also supported on an SCell, in addition to the PCell, to obtain UL synchronization for the SCells.

As stated earlier, in LTE Release 10, there was only one timing adjustment supported on the PCC UL. Thus, the eNodeB could perform timing adjustment (TA) for the UL PCC 704 by indicating a TA respective of the DL PCC 702 or one or more of the SCCs 706 and/or 708 (since the timing thereof can be synchronized). With the addition of UL SCC 710 and/or 712 included in CC2 and/or CC3, however, timing can vary over the UL PCC 704, UL SCC 710, and/or UL SCC 712, and thus a TA can be performed for each of the UL PCC 704 and UL SCC 710 and/or 712.

Random access on SCells may be network triggered by a PDCCH order. This is non-contention based RA. To support TA over the UL SCC 710 and/or 712, respective eNodeBs can transmit TA commands to the UE that specify a TA for the UE (e.g., respective of a timing difference reported or otherwise determined for the UE and a timing used in transmitting over the corresponding DL SCC 706 and/or 708). This can be done periodically (e.g., according to a TA timer) to ensure the UE is synchronized to the eNodeB for communicating over CC2 and CC3. Where a TA command is not communicated before the TA timer expires, or the UE misses the TA command before the timer expires, it may be determined that the UE is in an out-of-synchronization status, and that timing should be synchronized between the UE and eNodeB.

In LTE Release 10, the UE would perform RA on the PCell to obtain the timing adjustment. But this may not be possible for SCells, as the UE may perform RA on the SCell only when triggered by a PDCCH order, i.e., non-contention based RA, (which may not be sent until time and resources are wasted since the eNodeB may not be aware of the UE's out-of-synchronation status on the UL and may keep scheduling grants on the UL to which the UE will not respond because of the out-of-synchronization status). Since a PDCCH order is not sent, only a contention based RA procedure may be initialized by the UE. But this is not defined for LTE Release 10. A non-contention based random access cannot be used without the eNodeB becoming aware of the UE out-of-synchronization status. Since the UE may not be allowed to transmit anything on the UL, those resources may likely be wasted. The eNodeB may eventually realize that something is wrong, but it may not be not clear to the eNodeB that the problem is UL synchronization (as there may be other problems as well). In a first solution, if an eNodeB is not able to detect one or more configured/scheduled channels/signals (e.g., PUSCH, SRS) within a threshold period of time, or during a threshold number of consecutive configured/scheduled time instances on SCell(s) belonging to a SCell-only TA group, it halts UL scheduling for the UEs operating within those SCell(s) and sends the PDCCH order for the UEs to perform RA. This RA will be non-contention based.

In a second solution, the eNodeB may allow the UE to perform a contention based random access (RA) procedure on the SCell over the UL SCC 710 and/or 712, which includes functionality to synchronize timing with the respective eNodeBs over the carrier without the PDCCH order. Thus, the UE triggers a RA on the SCell, as on the PCell This may be allowed for the case when the UE is not UL synchronized (e.g., in the out-of-synchronization status) on an SCell, but still is receiving UL grants from the eNodeB for that cell. In this case, the eNodeB may send contention based resources to the UE.

A third solution uses additional signaling where a UE informs an eNodeB that it is unsynchronized (e.g., in the out-of-synchronization status) on the SCell by sending a message on the PCell UL carrier since that carrier is still synchronized. For example, the UE transmits the message informing eNB about the out-of-synchronization status with the SCell if the UE gets an UL grant for the SCell that is not UL synchronized. This message could be originated in the MAC or RRC layers.

In one example, resources for performing the RA over the UL SCC 710 and/or 712 may be non-contention based, and thus the UE can perform the RA procedure when so directed by the eNodeB. In this example, where the UE does not receive a TA command transmitted by the eNodeB, the eNodeB may not determine the UE to be in an out-of-synchronization status, and thus may continue sending uplink grants to the UE while not instructing or allowing the UE to perform an RA procedure until the TA timer tolls. In one solution, however, the UE can indicate its out-of-synchronization status to the eNodeB (e.g., using over the air signaling), and the eNodeB can thus allow the UE to perform RA (e.g., over the respective DL SCC 706 and/or 708). It is to be appreciated that the UE can maintain the UL PCC 704 (which can include performing separate TA), and thus can indicate the out-of-synchronization status over the UL PCC 704.

Figure 8:
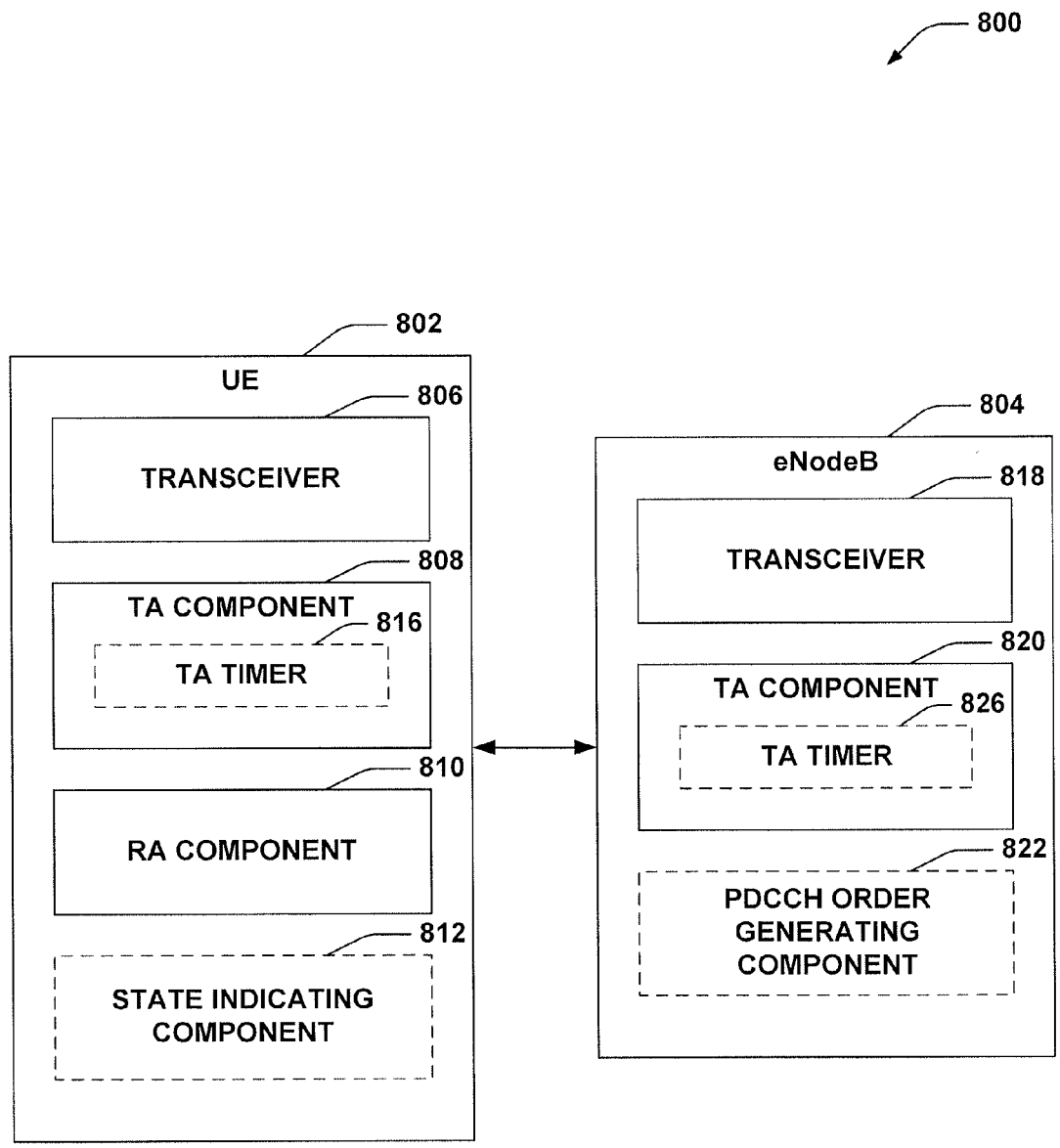
FIG. 8 is a block diagram of an example system for synchronizing timing of secondary component carriers (SCC)

FIG. 8 illustrates an example system 800 for performing random access to synchronize timing of a SCC. System 800 includes a UE 802 that communicates with an eNodeB 804 over one or more component carriers that include at least one SCC. The UE 802 can utilize CA, as described, to improve throughput by simultaneously communicating over a plurality of carriers to eNodeB 804 and/or other eNodeBs (not shown). UE 802 can be substantially any UE, modem (or other tethered device), a relay, a portion thereof, and/or the like, that can receive signals from an eNodeB and synchronize thereto. eNodeB 804 can be substantially any sort of eNodeB, such as a femto node, macro node, mobile eNodeB, relay, and/or the like, that communicates with UE 802 and sends timing adjustments thereto.

UE 802 can include a transceiver 806 for communicating with one or more eNodeBs over one or more component carriers, a TA component 808 for adjusting a timing for the carriers based on TA commands received from the eNodeBs, and a RA component 810 for performing an RA procedure with the one or more eNodeBs to synchronize timing therewith. UE 802 also optionally includes a state indicating component 812 for specifying a synchronization status for communicating to the one or more eNodeBs.

eNodeB 804 can include a transceiver 818 for communicating with a UE over one or more component carriers, a TA component 820 for adjusting timing for the carriers by issuing TA commands to the UE, and/or an optional PDCCH order generating component 822 for generating a PDCCH order a UE can utilize to perform RA over the one or more component carriers.

According to an example, transceivers 806 and 818 can communicate over a DL and/or UL of one or more component carriers. As described, UE 802 can be assigned a PCC and one or more SCCs for communicating with eNodeB 804 and/or other eNBs. That is, while only a single eNodeB is shown in FIG. 1, UE 802 may be assigned a PCC and one or more SCCs for communicating with more than one eNodeB. For example, UE may be configured to communicate with eNodeB 804 using the PCC, and may be configured to communicate with a second eNodeB (not shown) using a SCC. In this example, at least one of the carriers over which transceivers 806 and 818 communicate can be a SCC in CA. It is to be appreciated that transceivers 806 and 818 can include receive processors and/or transmit processors and related components, such as receive processor 338 or 358, transmit processor 320 or 364, related antennas 332 and 352, demods/mods 332 or 354, etc. TA component 820 can generate TA commands for communicating to UE 802 allowing UE 802 to adjust a timing for communicating over the SCC with eNodeB 804. The TA component 820 can provide the TA relative to a timing of the downlink SCC (e.g., based on an observed timing difference of the uplink SCC). In this example, transceiver 818 can communicate the TA to UE 802. Transceiver 806 can receive the TA, and TA component 808 can adjust timing for communicating over the carrier based on the TA and/or a current timing established for communicating over the carrier.

In one example, the UE 802 can be out-of-synchronization with the eNodeB 804 for communicating over the SCC. This can occur, for example, based on expiration of a TA timer without receiving a TA from the eNodeB 804, or one or more other events, messages, detected radio conditions, etc. In one example, TA timer 816 can be initialized upon receiving the TA command from the eNodeB 804, and reinitialized upon receiving subsequent TA commands. Once the timer expires without receiving a TA command from eNodeB 804, TA component 808 can determine the UE 802 is in an out-of-synchronization status with respect to the eNodeB 804 and the SCC. Once TA component 808 determines the UE 802 is out-of-synchronization, the UE 802 can refrain from communicating over the SCC, even though the eNodeB continues to send it grants, until timing is synchronized (which can be accomplished using an RA procedure, as described below).

For example, TA component 820 can use a similar TA timer 826, and where the TA timer 826 expires without transmitting a TA to UE 802, PDCCH order generating component 822 can generate a PDCCH order for causing UE 802 to perform a contention-free RA over the SCC, and transceiver 818 can accordingly communicate the PDCCH order to UE 802. Transceiver 806, in one example, can receive the PDCCH order, and RA component 810 can perform the contention-free RA over the SCC based on the PDCCH order. For example, this can include transmitting a RACH preamble indicated in the PDCCH order to eNodeB 804 using transceiver 806, and receiving a TA. It is to be appreciated, in another example, that the eNodeB 804 does not generate the PDCCH order for UE 802 where the eNodeB 804 desires to leave UE 802 unsynchronized.

In one example, upon TA component 808 determining that the UE 802 is in an out-of-synchronization status (e.g., based on TA timer 816 expiration), state indicating component 812 can generate an out-of-synchronization status indication for transmitting to eNodeB 804. For example, transceiver 806 can signal the indication over another carrier with the eNodeB 804 (e.g., the UL PCC or another UL SCC) or to another eNodeB (e.g., a separate eNodeB with which UE 802 is assigned the PCC) that can communicate the indication to eNodeB 804 over a backhaul link. Thus, transceiver 818 can receive the status from UE 802 (e.g., from UE 802 signaling over the UL PCC or another UL SCC, or by receiving the indication in a backhaul communication from another eNodeB with which UE 802 communicates over a PCC or SCC, and/or the like).

In yet another example, TA component 820 can detect whether the UE 802 is in the out-of-synchronization status even though TA component 820 sent a TA command thereto and/or though the TA timer 826 is not expired. In one example, TA component 820 can determine whether communications have been received over the UL SCC granted to UE 802 within a given period of time, during a threshold number of consecutive scheduled time instances, or threshold amount of time, etc. If not, the eNodeB 804 can determine the UE 802 is in the out-of-synchronization status, and/or eNodeB 804 can halt granting PUSCH resources to the UE for communicating over the SCC. Additionally or alternatively, the eNodeB 804 can determine whether certain channels or signals are received from UE 802 over the SCC, such as a sounding reference signal (SRS), to determine whether the UE 802 is in the out-of-synchronization status (e.g., that the UE did not receive a TA command sent by the eNodeB 804).

Furthermore, in an example, the eNodeB 804 may allow contention based RA over the SCC. In this example, where TA component 808 determines that UE 802 is in the out-of-synchronization status, RA component 810 can perform a contention based RA procedure with eNodeB 804 over the SCC, as described, to synchronize communications over the SCC without having to wait for a PDCCH order from eNodeB 804. This can include transmitting a RA preamble, as described, receiving a TA, sending an identity of UE 802 to facilitate contention resolution, and receiving a contention resolution from eNodeB 804.

Moreover, for example, the SCCs utilized by UE 802 can be grouped for synchronization purposes. Thus, TA component 808 can apply TA commands to the SCCs in a group. Similarly, TA component 808 can determine synchronization status for the group based on receiving or not receiving TA commands for one SCC in the group, and/or can accordingly inform eNodeB 804 of an out-of-synchronization status for the group, perform the RA procedure for the group, etc.

In addition, it is to be appreciated that the components 808, 810, 812, 820, and/or 822 can be part of a processor and/or implemented by the processor. The components 808, 810, 812, 820, and/or 822 can utilize other components of the UE 802 and/or eNodeB 804 to perform the described functionalities, such as transceivers 806 and/or 818 for communicating over the air or over backhaul links, a memory for storing instructions executed by the processor or relating to the functionalities, and/or the like.

Figure 9:
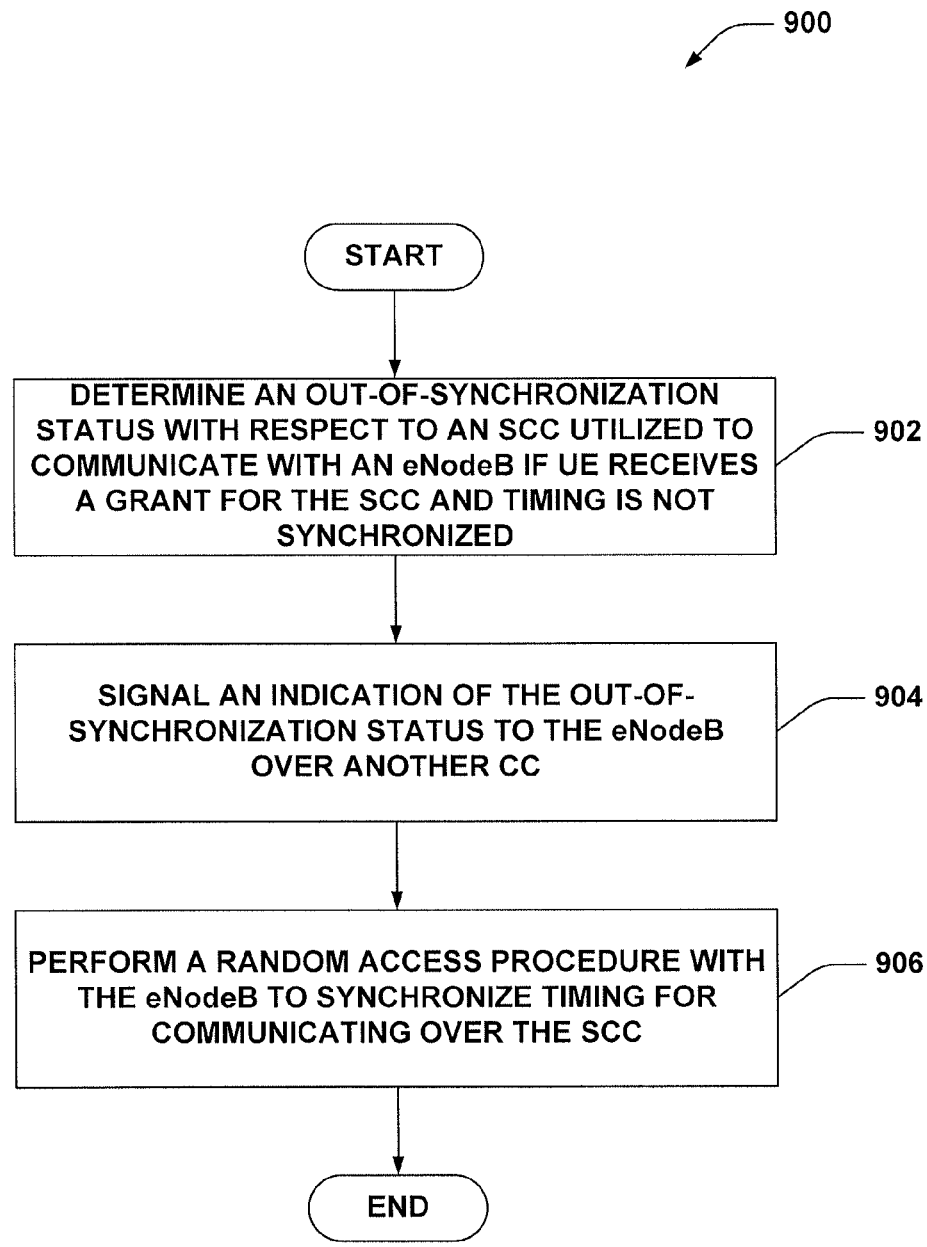
FIG. 9 is an aspect of an example methodology for synchronizing timing with an eNodeB.
Figure 10:
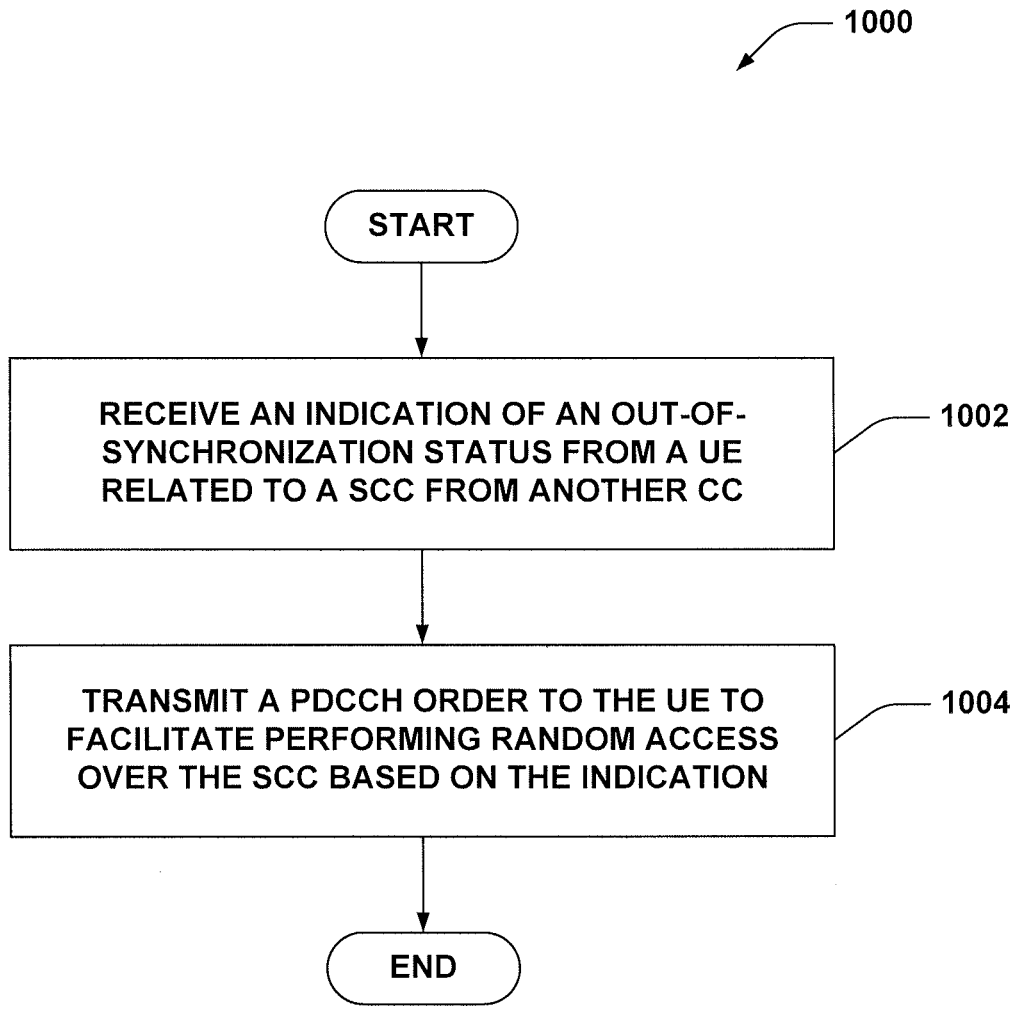
FIG. 10 is an aspect of an example methodology for assigning random access (RA) resources to a device for synchronizing timing.
Figure 11:
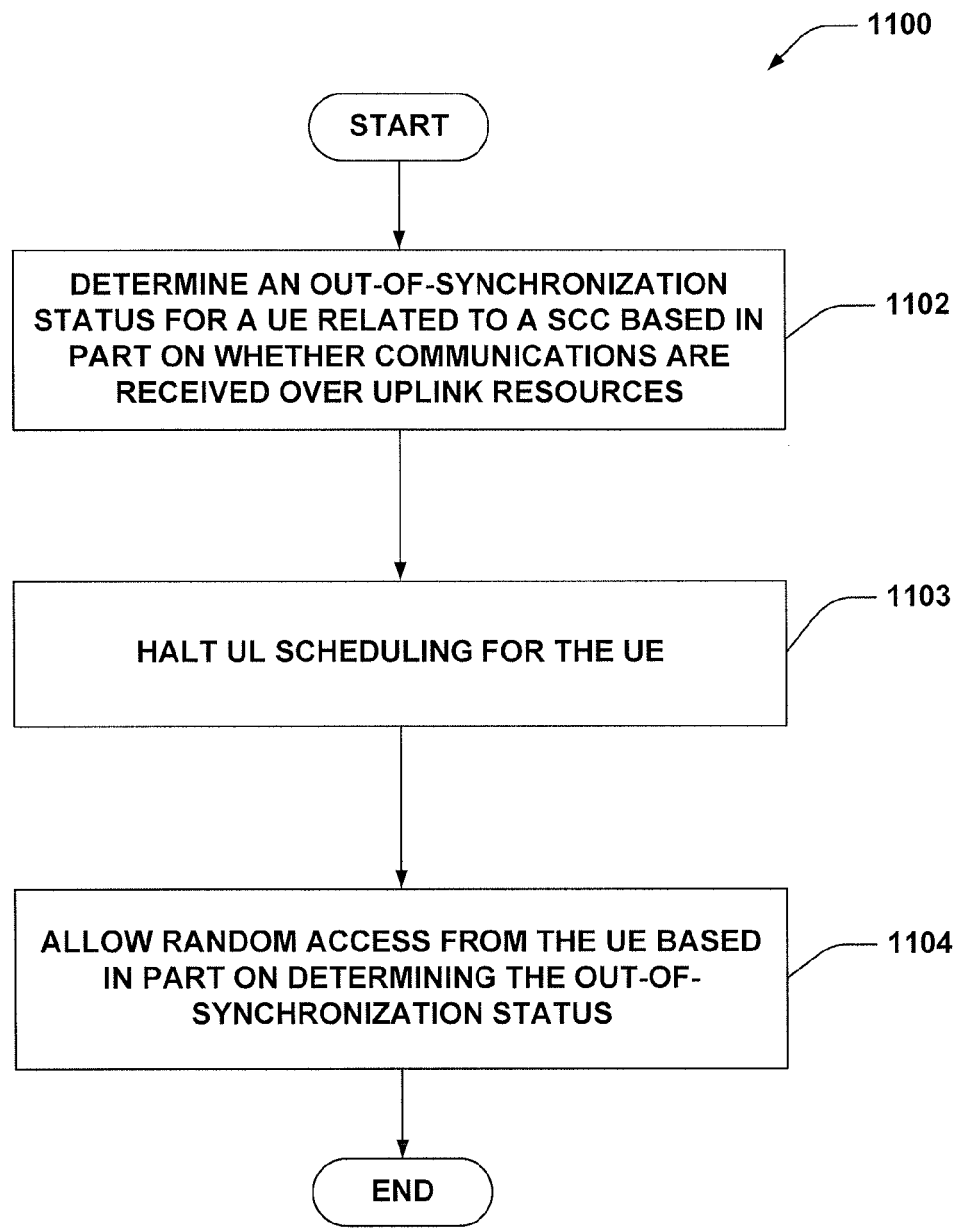
FIG. 11 is an aspect of an example methodology for assigning RA resources to a device for synchronizing timing.

FIGS. 9-11 below illustrate example methodologies relating to synchronizing timing with an eNodeB providing an SCC. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 9 illustrates an example methodology 900 for synchronizing timing with an eNodeB for an SCC. At 902, an out-of-synchronization status can be determined with respect to an SCC utilized to communicate with an eNodeB. For example, this can be based on expiration of a TA timer between receiving TA commands, one or more messages received over one or more other carriers, one or more other events, and/or the like. As described, the out-of-synchronization status can indicate that timing is not synchronized over a SCC and/or with the corresponding eNodeB, and thus uplink grants received from the eNodeB are not utilized by the UE to communicate with the eNodeB until timing is synchronized.

At 904, an indication of the out-of-synchronization status can be signaled to the eNodeB. This can include transmitting the indication over a PCC (or another carrier) to the eNodeB 804 or another eNodeB. In the latter example, the other eNodeB can forward the indication to the eNodeB. In one example, signaling the indication can occur after one or more other events as well, such as receiving an uplink grant from the eNodeB.

At 906, a random access procedure can be performed with the eNodeB to synchronize timing for communicating over the SCC. For example, the random access procedure can include a plurality of messages to establish a connection with the eNodeB, such that following the procedure, timing is synchronized with the eNodeB, and grants can be received for communicating with the eNodeB. For example, a PDCCH order can be received from the eNodeB based in part on the signaled indication of the out-of-synchronization status. The PDCCH order can include one or more parameters or commands for performing the RA procedure, such as a RA preamble.

FIG. 10 illustrates an example methodology 1000 for providing random access resources to a UE to allow synchronization of timing. At 1002, an indication of an out-of-synchronization status related to a SCC can be received from a UE. For example, the indication can be received from the UE via signaling over a PCC or another carrier established with the UE. In another example, the indication can be received in a communication over a backhaul link from an eNodeB that established the PCC with the UE.

At 1004, a PDCCH order can be transmitted to the UE to facilitate performing random access over the SCC based on the indication. For example, the PDCCH order can include an RA preamble or other parameters related to performing the RA. For example, the PDCCH order can be received over the DL SCC.

FIG. 11 illustrates an example methodology 1100 for providing random access resources to a UE to allow synchronization of timing. At 1102, an out-of-synchronization status for a UE related to a SCC can be determined based in part on whether communications are received over uplink resources. For example, if communications are not received over an uplink resource grant within a period of time or during a threshold number of consecutive time instances on the SCC, the out-of-synchronization status can be determined. In other examples, out-of-synchronization status can be determined based on whether certain signals are received from the UE, such as a sounding reference signal, within a period of time.

At 1103, UL scheduling for the UE is halted. For example, this can be based on determining the out-of-synchronization status, and can include refraining from providing or otherwise allocating uplink grants to the UE. At 1104, random access from the UE can be allowed based on determining the out-of-synchronization status. For example, as described, this can include communicating a PDCCH order to the UE for performing random access.

Figure 12:
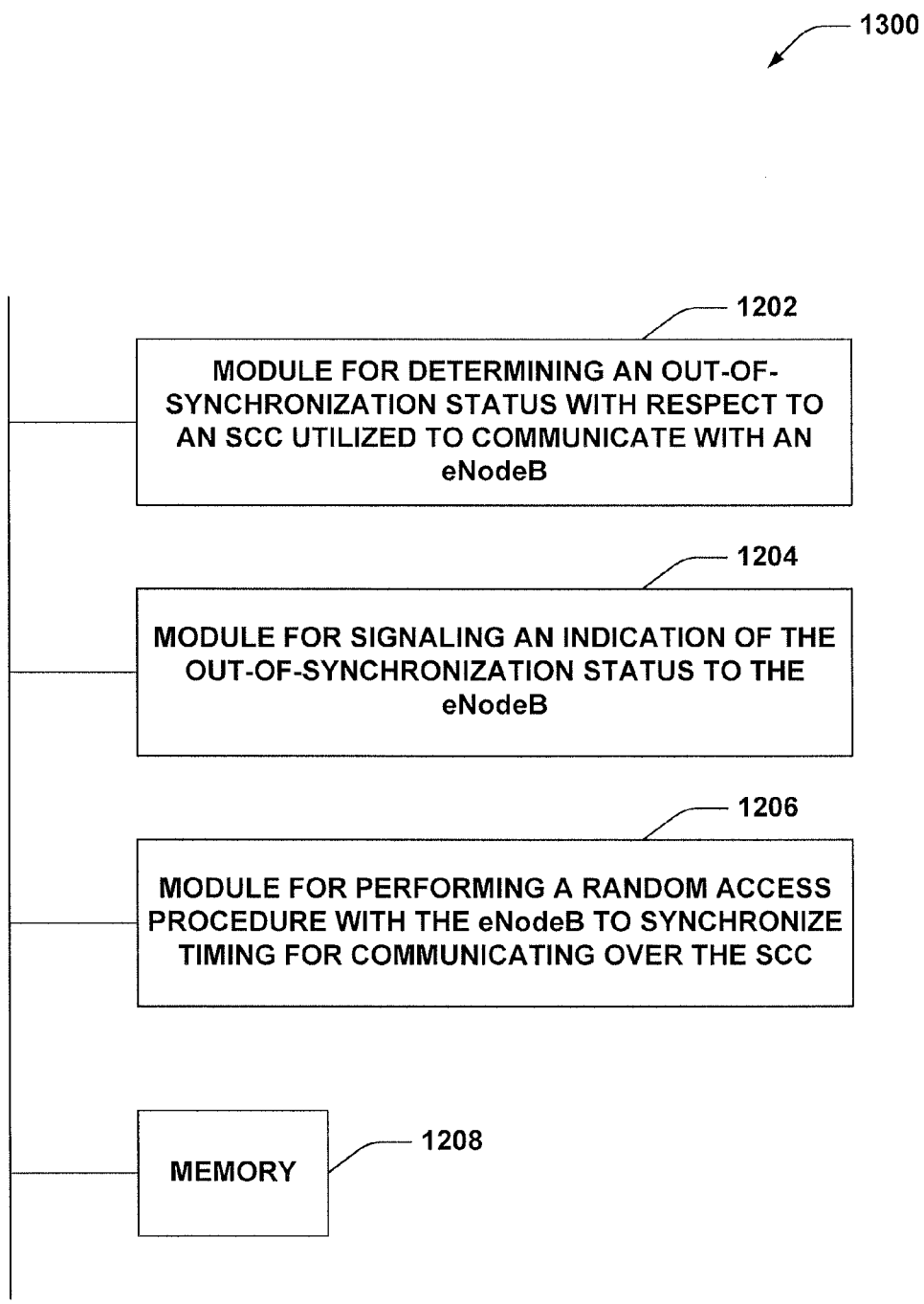
FIG. 12 is a block diagram of an example system that performs an RA procedure to synchronize timing with an eNodeB.

FIG. 12 is a block diagram representation of a portion of a wireless communication apparatus 1200 comprising module 1202 for determining an out-of-synchronization status with respect to an SCC utilized to communicate with an eNodeB, module 1204 for signaling an indication of the out-of-synchronization status to the eNodeB, module 1206 for performing a random access procedure with the eNodeB to synchronize timing for communicating over the SCC. The apparatus 1200 also includes memory 1208 within which the modules 1202, 1204, and 1206 can be implemented. Additionally or alternatively, memory 1208 can include instructions for executing modules 1202, 1204, and 1206, parameters related to modules 1202, 1204, and 1206, and/or the like. The apparatus 1200 may further implement various techniques described herein. In one example, the apparatus 1200 can include a UE 120, UE 802, etc., with additional components to perform the techniques described herein (e.g., a processor 380 to execute associated instructions, and/or the like).

Figure 13:
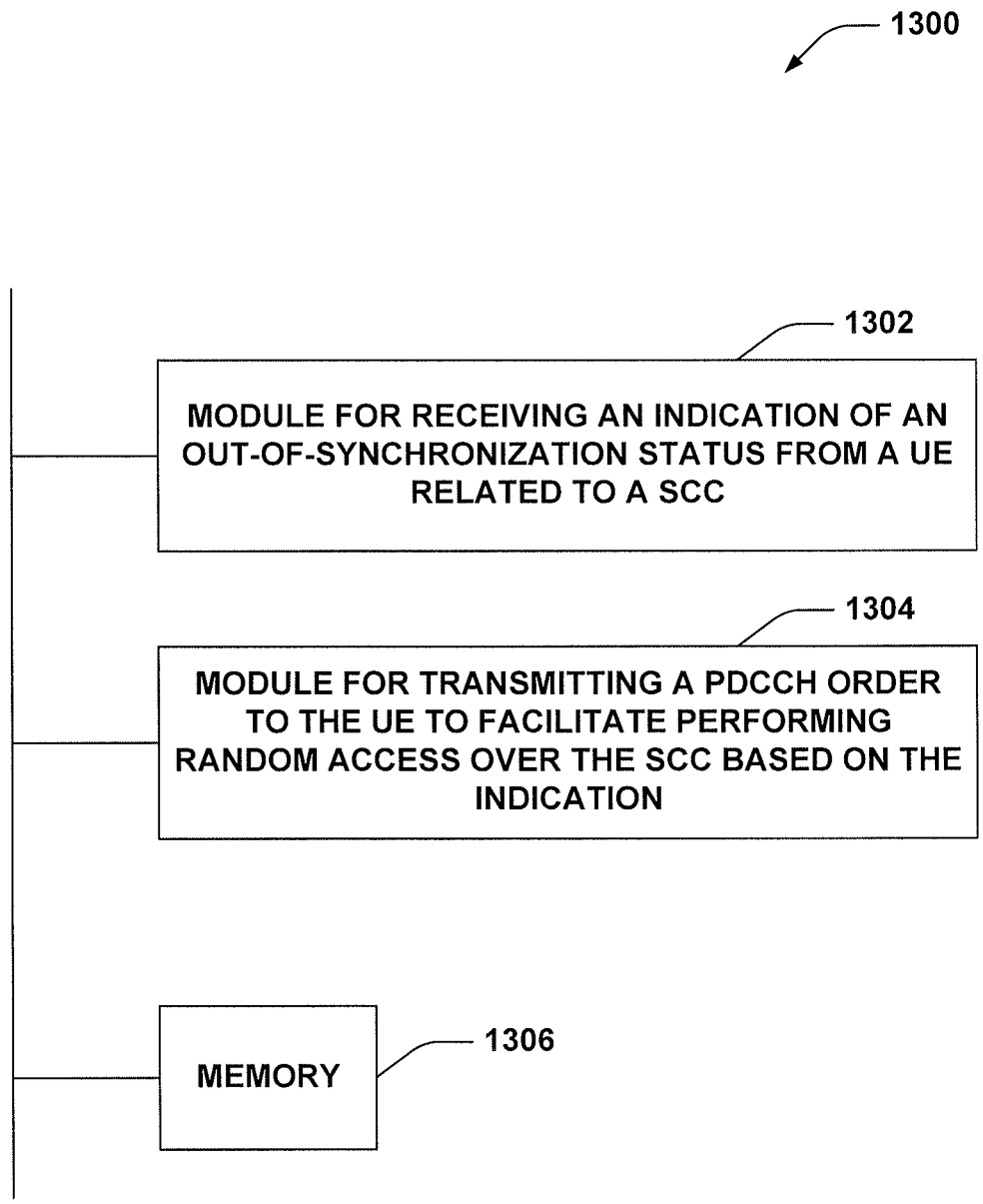
FIG. 13 is a block diagram of an example system that assigns RA resources to a device for synchronizing timing.

FIG. 13 is a block diagram representation of a portion of a wireless communication apparatus 1300 comprising module 1302 for receiving an indication of an out-of-synchronization status from a UE related to a SCC, and module 1304 for transmitting a PDCCH order to the UE to facilitate performing random access over the SCC based on the indication. The apparatus 1300 also includes memory 1306 within which the modules 1302 and 1304 can be implemented. Additionally or alternatively, memory 1306 can include instructions for executing modules 1302 and 1304, parameters related to modules 1302 and 1304, and/or the like. The apparatus 1300 may further implement various techniques described herein. In one example, the apparatus 1300 can include an eNodeB 110, eNodeB 804, etc., with additional components to perform the techniques described herein (e.g., a processor 340 to execute associated instructions, and/or the like).

Figure 14:
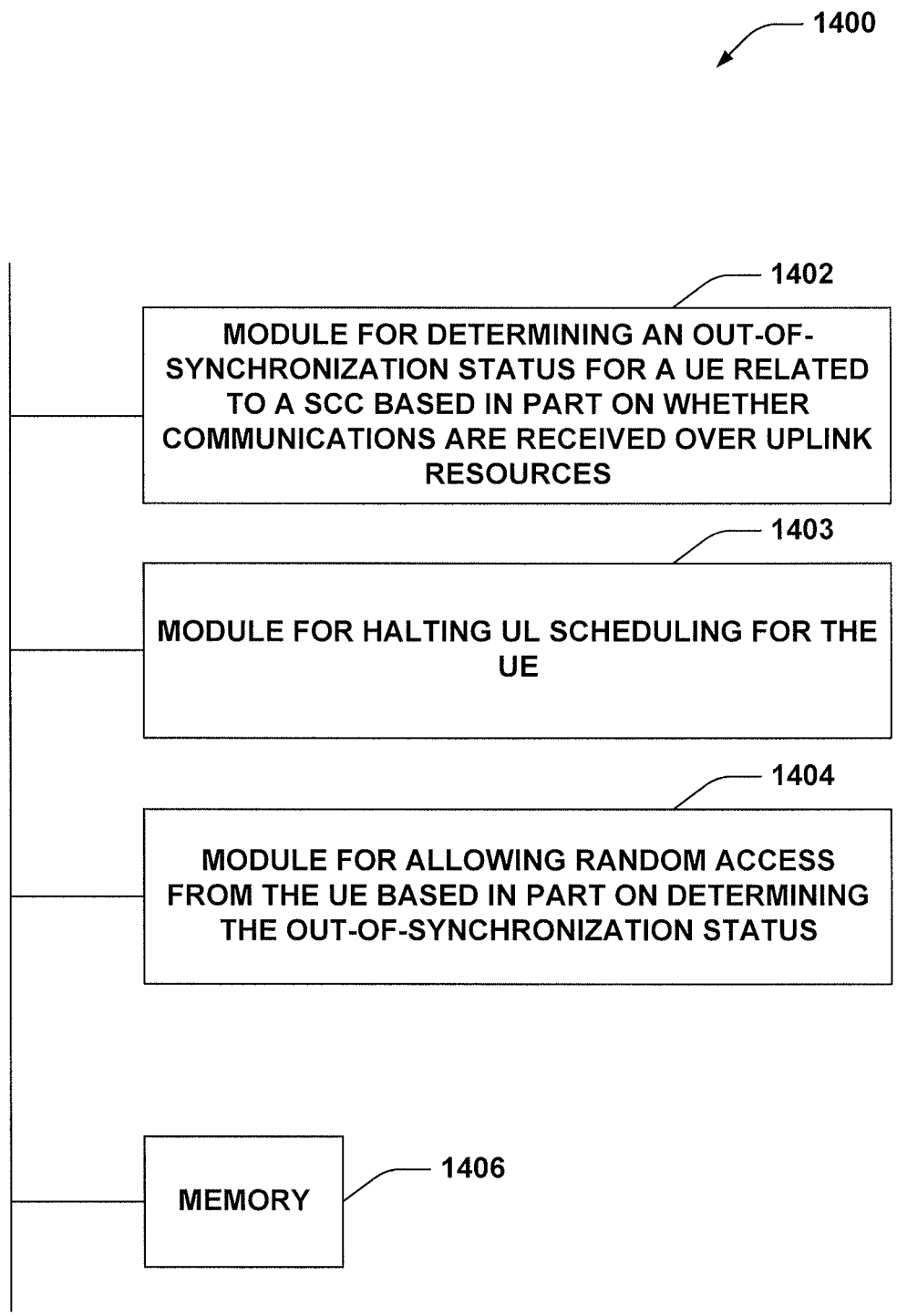
FIG. 14 is a block diagram of an example system that assigns RA resources to a device for synchronizing timing.

FIG. 14 is a block diagram representation of a portion of a wireless communication apparatus 1400 comprising module 1402 for determining an out-of-synchronization status for a UE related to a SCC based in part on whether communications are received over uplink resources, a module for halting uplink scheduling for the UE 1403, and module 1404 for allowing random access from the UE based in part on determining the out-of-synchronization status. The apparatus 1400 also includes memory 1406 within which the modules 1402, 1403, and 1404 can be implemented. Additionally or alternatively, memory 1406 can include instructions for executing modules 1402, 1403, and 1404, parameters related to modules 1402, 1403, and 1404, and/or the like. The apparatus 1400 may further implement various techniques described herein. In one example, the apparatus 1400 can include an eNodeB 110, eNodeB 804, etc., with additional components to perform the techniques described herein (e.g., a processor 340 to execute associated instructions, and/or the like).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for synchronizing timing related to a secondary component carrier (SCC) in carrier aggregated wireless networks, comprising:
    determining an out-of-synchronization status with respect to the SCC utilized to communicate with an eNodeB;
    signaling an indication of the out-of-synchronization status to the eNodeB over a primary component carrier utilized to communicate with the eNodeB or another eNodeB; and
    performing a random access procedure with the eNodeB to synchronize timing for communicating over the SCC.

2. The method of claim 1, further comprising detecting an uplink grant from the eNodeB following the determining the out-of-synchronization status, wherein the signaling occurs based on whether uplink grants are received when timing is not synchronized.

3. The method of claim 1, further comprising receiving a physical downlink control channel (PDCCH) order from the eNodeB over the SCC, wherein the random access procedure is triggered based on the PDCCH order.

4. The method of claim 1, wherein the signaling comprising signaling the indication to the eNodeB as a media access control (MAC) or radio resource control (RRC) message.

5. The method of claim 1, wherein performing the random access procedure with the eNodeB comprises performing a contention based random access procedure.

6. The method of claim 5, further comprising detecting an uplink grant from the eNodeB following the determining the out-of-synchronization status, wherein the performing the contention based random access procedure is based on whether uplink grants are received when timing is not synchronized.

7. An apparatus for synchronizing timing related to a secondary component carrier (SCC) in carrier aggregated wireless networks, comprising:
    means for determining an out-of-synchronization status with respect to the SCC utilized to communicate with an eNodeB;
    means for signaling an indication of the out-of-synchronization status to the eNodeB over a primary component carrier utilized to communicate with the eNodeB or another eNodeB; and
    means for performing a random access procedure with the eNodeB to synchronize timing for communicating over the SCC.

8. The apparatus of claim 7, further comprising means for detecting an uplink grant from the eNodeB following the determining the out-of-synchronization status, wherein the means for signaling signals based on whether uplink grants are received when timing is not synchronized.

9. The apparatus of claim 7, further comprising means for receiving a physical downlink control channel (PDCCH) order from the eNodeB over the SCC, wherein the random access procedure is triggered based on the PDCCH order.

10. The apparatus of claim 7, wherein the means for signaling signals the indication to the eNodeB as a media access control (MAC) or radio resource control (RRC) message.

11. The apparatus of claim 7, wherein the means for performing a random access procedure with the eNodeB comprises means for performing a contention based random access procedure.

12. The apparatus of claim 11, further comprising means for detecting an uplink grant from the eNodeB following the determining the out-of-synchronization status, wherein the means for performing performs the contention based random access procedure is based on whether uplink grants are received when timing is not synchronized.

13. A non-transitory computer-readable medium comprising:
    code for causing at least one computer to determine an out-of-synchronization status with respect to a secondary component carrier (SCC) utilized to communicate with an eNodeB;
    code for causing the at least one computer to signal an indication of the out-of-synchronization status to the eNodeB over a primary component carrier utilized to communicate with the eNodeB or another eNodeB; and
    code for causing the at least one computer to perform a random access procedure with the eNodeB to synchronize timing for communicating over the SCC.

14. The non-transitory computer-readable medium of claim 13, further comprising code for causing the at least one computer to detect an uplink grant from the eNodeB following the determining the out-of-synchronization status, wherein the code for causing the at least one computer to signal signals based on whether uplink grants are received when timing is not synchronized.

15. The non-transitory computer-readable medium of claim 13, further comprising code for causing the at least one computer to receive a physical downlink control channel (PDCCH) order from the eNodeB over the SCC, wherein the random access procedure is triggered based on the PDCCH order.

16. The non-transitory computer-readable medium of claim 13, wherein the code for causing the at least one computer to signal signals the indication to the eNodeB as a media access control (MAC) or radio resource control (RRC) message.

17. The non-transitory computer-readable medium of claim 13, wherein the code for causing the at least one computer to perform a random access procedure with the eNodeB comprises code for causing the at least one computer to perform a contention based random access procedure.

18. The non-transitory computer-readable medium of claim 17, further comprising code for causing the at least one computer to detect an uplink grant from the eNodeB following the determining the out-of-synchronization status, wherein the code for causing the at least one computer to perform performs the contention based random access procedure is based on whether uplink grants are received when timing is not synchronized.

19. A user equipment (UE) for synchronizing timing related to a secondary component carrier (SCC) in carrier aggregated wireless networks, comprising:
    at least one processor; and
    a memory coupled to the at least one processor, wherein the at least one processor is configured to:

determine an out-of-synchronization status with respect to the SCC utilized to communicate with an eNodeB;
signal an indication of the out-of-synchronization status to the eNodeB over a primary component carrier utilized to communicate with the eNodeB or another eNodeB; and
perform a random access procedure with the eNodeB to synchronize timing for communicating over the SCC.

20. The UE of claim 19, wherein the at least one processor is further configured to detect an uplink grant from the eNodeB following the determining the out-of-synchronization status, wherein the at least one processor signals based on whether uplink grants are received when timing is not synchronized.

21. The UE of claim 19, wherein the at least one processor is further configured to receive a physical downlink control channel (PDCCH) order from the eNodeB over the SCC, wherein the random access procedure is triggered based on the PDCCH order.

22. The UE of claim 19, wherein the at least one processor signals the indication to the eNodeB as a media access control (MAC) or radio resource control (RRC) message.

23. The UE of claim 19, wherein the at least one processor is configured to perform a contention based random access procedure with the eNodeB.

24. The UE of claim 23, wherein the at least one processor is further configured to detect an uplink grant from the eNodeB following the determining the out-of-synchronization status, wherein the at least one processor performs the contention based random access procedure is based on whether uplink grants are received when timing is not synchronized.

25. A method for facilitating random access over a secondary component carrier (SCC), comprising:
receiving an indication of an out-of-synchronization status from a UE related to the SCC over a primary component carrier with the UE; and
transmitting a physical downlink control channel order to the UE to facilitate performing random access over the SCC based on the indication.

26. The method of claim 25, wherein the receiving comprising receiving the indication in a media access control (MAC) or radio resource control (RRC) message from the UE.

27. The method of claim 25, wherein the receiving comprises receiving the indication over a backhaul link with another eNodeB having a primary component carrier with the UE.

28. An apparatus for facilitating random access over a secondary component carrier (SCC), comprising:
means for receiving an indication of an out-of-synchronization status from a UE related to the SCC over a primary component carrier with the UE; and
means for transmitting a physical downlink control channel order to the UE to facilitate performing random access over the SCC based on the indication.

29. The apparatus of claim 28, wherein the means for receiving receives the indication in a media access control (MAC) or radio resource control (RRC) message from the UE.

30. The apparatus of claim 28, wherein the means for receiving receives the indication over a backhaul link with another eNodeB having a primary component carrier with the UE.

31. A non-transitory computer-readable medium comprising:
code for causing at least one computer to receive an indication of an out-of-synchronization status from a UE related to a secondary component carrier (SCC) over a primary component carrier with the UE; and
code for causing the at least one computer to transmit a physical downlink control channel order to the UE to facilitate performing random access over the SCC based on the indication.

32. The non-transitory computer-readable medium of claim 31, wherein the code for causing the at least one computer to receive receives the indication in a media access control (MAC) or radio resource control (RRC) message from the UE.

33. The non-transitory computer-readable medium of claim 31, wherein the code for causing the at least one computer to receive receives the indication over a backhaul link with another eNodeB having a primary component carrier with the UE.

34. An apparatus for facilitating random access over a secondary component carrier (SCC), comprising:
at least one processor; and
a memory coupled to the at least one processor, wherein the at least one processor is configured to:
receive an indication of an out-of-synchronization status from a UE related to the SCC over a primary component carrier with the UE; and
transmit a physical downlink control channel order to the UE to facilitate performing random access over the SCC based on the indication.

35. The apparatus of claim 34, wherein the at least one processor receives the indication in a media access control (MAC) or radio resource control (RRC) message from the UE.

36. The apparatus of claim 34, wherein the at least one processor receives the indication over a backhaul link with another eNodeB having a primary component carrier with the UE.

37. A method for providing random access resources to a UE for a secondary component carrier (SCC), comprising:
determining an out-of-synchronization status for a UE related to the SCC based in part on whether communications are received over uplink resources granted to the UE in a time period or during a threshold number of consecutive time instances;
halting uplink scheduling for the UE based on determining the out-of-synchronization status; and
allowing random access from the UE based on determining the out-of-synchronization status.

38. The method of claim 37, wherein the determining the out-of-synchronization status is further based in part on whether a sounding reference signal is received from the UE.

39. The method of claim 37, wherein the random access is done when the UE is not synchronized on a secondary cell, but is still receiving uplink grants for the secondary cell.

40. The method of claim 37, further comprising transmitting a physical downlink control channel order to the UE to facilitate performing random access over the SCC based on determining the out-of-synchronization status.

41. An apparatus for providing random access resources to a UE for a secondary component carrier (SCC), comprising:
means for determining an out-of-synchronization status for a UE related to the SCC based in part on whether communications are received over uplink resources granted to the UE in a time period or during a threshold number of consecutive time instances;
means for halting uplink scheduling for the UE based on determining the out-of-synchronization status; and
means for allowing random access from the UE based on determining the out-of-synchronization status.

42. The apparatus of claim 41, wherein the means for determining determines the out-of-synchronization status further based in part on whether a sounding reference signal is received from the UE.

43. The apparatus of claim 41, wherein the random access is done when the UE is not synchronized on a secondary cell, but is still receiving uplink grants for the secondary cell.

44. The apparatus of claim 41, further comprising means for transmitting a physical downlink control channel order to the UE to facilitate performing random access over the SCC based on determining the out-of-synchronization status.

45. A non-transitory computer-readable medium comprising:
   code for causing at least one computer to determine an out-of-synchronization status for a UE related to a secondary component carrier (SCC) based in part on whether communications are received over uplink resources granted to the UE in a time period or during a threshold number of consecutive time instances;
   code for causing the at least one computer to halt uplink scheduling for the UE based on determining the out-of-synchronization status; and
   code for causing the at least one computer to allow random access from the UE based on determining the out-of-synchronization status.

46. The non-transitory computer-readable medium of claim 45, wherein the code for causing the at least one computer to determine determines the out-of-synchronization status further based in part on whether a sounding reference signal is received from the UE.

47. The non-transitory computer-readable medium of claim 45, wherein the random access is done when the UE is not synchronized on a secondary cell, but is still receiving uplink grants for the secondary cell.

48. The non-transitory computer-readable medium of claim 45, further comprising code for causing the at least one computer to transmit a physical downlink control channel order to the UE to facilitate performing random access over the SCC based on determining the out-of-synchronization status.

49. A user equipment (UE) for providing random access resources to a UE for a secondary component carrier (SCC), comprising:
   at least one processor; and
   a memory coupled to the at least one processor, wherein the
      at least one processor is configured to:
         determine an out-of-synchronization status for the UE related to the SCC based in part on whether communications are received over uplink resources granted to the UE in a time period or during a threshold number of consecutive time instances;
         halt uplink scheduling for the UE based on determining the out-of-synchronization status; and
         allow random access from the UE based on determining the out-of-synchronization status.

50. The UE of claim 49, wherein the at least one processor determines the out-of-synchronization status further based in part on whether a sounding reference signal is received from the UE.

51. The UE of claim 49, wherein the random access is done when the UE is not synchronized on a secondary cell, but is still receiving uplink grants for the secondary cell.

52. The UE of claim 49, wherein the at least one processor is further configured to transmit a physical downlink control channel order to the UE to facilitate performing random access over the SCC based on determining the out-of-synchronization status.

* * * * *

UNITED STATES PATENT AND TRADEMARK OFFICE
CERTIFICATE OF CORRECTION

| | | |
|---|---|---|
| PATENT NO. | : 9,094,988 B2 | Page 1 of 1 |
| APPLICATION NO. | : 13/740886 | |
| DATED | : July 28, 2015 | |
| INVENTOR(S) | : Damnjanovic et al. | |

It is certified that error appears in the above-identified patent and that said Letters Patent is hereby corrected as shown below:

Title Page

Inventors reads:

(72) Inventors: Jelena M. Damnjanovic, Del Mar, CA (US); Peter Gaal, San Diego, CA (US); Wanshi Chen, San Diego, CA (US); Aleksandar Damnjanovic, Del Mar, CA (US); Masato Kitazoe, Tokyo (JP)

Inventors should read:

(72) Inventors: Jelena Damnjanovic, Del Mar, CA (US); Peter Gaal, San Diego, CA (US); Wanshi Chen, San Diego, CA (US); Aleksandar Damnjanovic, Del Mar, CA (US); Masato Kitazoe, Tokyo (JP)

Signed and Sealed this
Fifteenth Day of December, 2015

Michelle K. Lee
*Director of the United States Patent and Trademark Office*